(12) United States Patent
Flaute et al.

(10) Patent No.: US 11,492,824 B2
(45) Date of Patent: Nov. 8, 2022

(54) LATCH ASSEMBLY FOR GLOVEBOX

(71) Applicant: NIFCO AMERICA CORP., Canal Winchester, OH (US)

(72) Inventors: Kevin Flaute, Canal Winchester, OH (US); Derek Recker, Canal Winchester, OH (US); Joe Wu, Canal Winchester, OH (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 943 days.

(21) Appl. No.: 15/886,459

(22) Filed: Feb. 1, 2018

(65) Prior Publication Data

US 2019/0234120 A1 Aug. 1, 2019

(51) Int. Cl.
*E05B 83/30* (2014.01)
*B60R 7/06* (2006.01)
(Continued)

(52) U.S. Cl.
CPC ............... *E05B 83/30* (2013.01); *B60R 7/06* (2013.01); *E05B 63/0017* (2013.01); *E05B 85/107* (2013.01); *E05C 1/06* (2013.01); *E05C 1/145* (2013.01); *E05C 9/043* (2013.01); *Y10S 292/11* (2013.01); *Y10S 292/31* (2013.01); *Y10T 292/084* (2015.04); *Y10T 292/0834* (2015.04); *Y10T 292/0836* (2015.04); *Y10T 292/0837* (2015.04); *Y10T 292/0846* (2015.04); *Y10T 292/0894* (2015.04); *Y10T 292/0902* (2015.04);
(Continued)

(58) Field of Classification Search
CPC ........ E05B 85/107; E05B 41/00; E05B 17/10; E05B 17/22; E05B 63/0017; E05B 83/30; E05B 2047/0058; E05B 13/101; B60R 7/06; E05C 1/06; E05C 1/145; E05C 9/043; Y10S 292/11; Y10S 292/31; Y10T 292/096; Y10T 292/0961; Y10T 292/0969; Y10T 292/0834; Y10T 292/0836; Y10T 292/0837; Y10T 292/084; Y10T 292/0846; Y10T 292/0894; Y10T 292/0902; Y10T 292/1016; Y10T 292/0994
USPC ........ 296/37.12, 24.34, 37.8, 100.04, 100.07
See application file for complete search history.

(56) References Cited

U.S. PATENT DOCUMENTS

| 3,080,743 | A | * | 3/1963 | Stansberry | ................ E05B 5/00 |
| | | | | | 70/208 |
| 3,081,617 | A | * | 3/1963 | Mckay | .................... E05C 1/145 |
| | | | | | 70/153 |

(Continued)

*Primary Examiner* — Christine M Mills
*Assistant Examiner* — Faria F Ahmad
(74) *Attorney, Agent, or Firm* — Manabu Kanesaka

(57) ABSTRACT

A latch assembly for closing a door of a glovebox compartment includes a key cylinder having an eccentric shaft; a striker connected to the key cylinder to form a scotch-yoke connection to the eccentric shaft so that a rotation of the key cylinder is transformed to a linear movement of the striker; and a pair of latching members to lock the door. The pair of latching members includes a first latching member having an operation portion to engage or disengage from the striker, and a second latching member connected to the first latching member to simultaneously move with the first latching member. The key cylinder rotates to switch between an unlocked state in which the striker engages the operation portion and a locked state in which the striker is disengaged from the operation portion.

8 Claims, 11 Drawing Sheets

(51) Int. Cl.
*E05C 1/14* (2006.01)
*E05C 1/06* (2006.01)
*E05B 63/00* (2006.01)
*E05B 85/10* (2014.01)
*E05C 9/04* (2006.01)

(52) U.S. Cl.
CPC ...... *Y10T 292/096* (2015.04); *Y10T 292/0961* (2015.04); *Y10T 292/0994* (2015.04); *Y10T 292/1016* (2015.04)

(56) References Cited

U.S. PATENT DOCUMENTS

| | | | | |
|---|---|---|---|---|
| 4,476,700 A * | 10/1984 | King | ............... | E05C 9/041 292/39 |
| 4,510,779 A * | 4/1985 | Ahad | ............... | E05B 5/00 292/DIG. 31 |
| 4,638,649 A * | 1/1987 | Chao | ............... | E05B 65/5269 292/207 |
| 4,951,486 A * | 8/1990 | Braun | ............... | E05C 9/046 292/DIG. 31 |
| 4,962,652 A * | 10/1990 | Schneider | ............... | E05C 9/041 292/DIG. 14 |
| 5,174,619 A * | 12/1992 | Bender | ............... | E05B 83/16 292/336.3 |
| 5,253,903 A * | 10/1993 | Daley | ............... | E05C 9/041 292/142 |
| 5,263,346 A * | 11/1993 | Sato | ............... | E05B 83/30 292/DIG. 38 |
| 5,292,159 A * | 3/1994 | Sandhu | ............... | E05B 15/1635 292/173 |
| 5,439,260 A * | 8/1995 | Weinerman | ............... | E05B 5/00 292/216 |
| 5,481,889 A * | 1/1996 | Richard | ............... | E05B 13/106 292/142 |
| 5,484,178 A * | 1/1996 | Sandhu | ............... | E05B 83/30 292/169 |
| 5,927,772 A * | 7/1999 | Antonucci | ............... | E05B 85/18 292/336.3 |
| 5,927,773 A * | 7/1999 | Larsen | ............... | E05C 1/145 292/DIG. 31 |
| 6,547,290 B1 * | 4/2003 | Zenner | ............... | E05B 9/00 292/167 |
| 6,708,537 B1 * | 3/2004 | Eschweiler | ............... | E05B 5/00 292/DIG. 27 |
| 7,036,852 B2 * | 5/2006 | Cho | ............... | E05B 83/30 292/33 |
| 7,048,311 B2 * | 5/2006 | Sawatani | ............... | B60R 7/06 292/33 |
| 7,182,373 B2 * | 2/2007 | Yamada | ............... | E05B 83/30 292/32 |
| 7,383,707 B2 * | 6/2008 | Yamada | ............... | E05B 83/30 292/DIG. 63 |
| 7,455,333 B2 * | 11/2008 | Ookawara | ............... | E05B 83/30 292/34 |
| 7,603,881 B2 * | 10/2009 | Yukihara | ............... | B60R 7/06 292/216 |
| 7,832,239 B2 * | 11/2010 | Kozuka | ............... | E05B 83/30 70/162 |
| 8,141,398 B2 * | 3/2012 | Ookawara | ............... | E05C 1/145 292/109 |
| 8,590,351 B2 * | 11/2013 | Ookawara | ............... | E05B 83/30 70/162 |
| 8,733,139 B2 * | 5/2014 | Pickar | ............... | E05B 81/25 292/DIG. 31 |
| 9,074,389 B2 * | 7/2015 | Shimizu | ............... | E05B 15/00 |
| 9,121,206 B2 * | 9/2015 | Shimizu | ............... | E05C 9/042 |
| 9,850,691 B2 * | 12/2017 | Nakasone | ............... | E05C 9/042 |
| 10,214,946 B2 * | 2/2019 | Fukumoto | ............... | E05C 1/12 |
| 10,480,223 B2 * | 11/2019 | Nakasone | ............... | E05C 9/043 |
| 10,612,279 B2 * | 4/2020 | Nakasone | ............... | B60R 7/06 |
| 10,738,511 B2 * | 8/2020 | Nakasone | ............... | E05C 9/04 |
| 11,359,420 B2 * | 6/2022 | Singh | ............... | E05B 83/30 |
| 2002/0171248 A1 * | 11/2002 | Diss | ............... | E05B 83/30 292/164 |
| 2004/0168487 A1 * | 9/2004 | Sawatani | ............... | E05B 83/30 70/145 |
| 2004/0239125 A1 * | 12/2004 | Chen | ............... | E05B 5/00 292/216 |
| 2005/0006906 A1 * | 1/2005 | Yamada | ............... | E05B 83/30 292/63 |
| 2006/0279094 A1 * | 12/2006 | Tweedy | ............... | E05C 9/06 292/336.3 |
| 2007/0114809 A1 * | 5/2007 | Yukihara | ............... | E05B 5/00 296/37.8 |
| 2007/0163310 A1 * | 7/2007 | Ookawara | ............... | E05C 1/145 70/208 |
| 2007/0186598 A1 * | 8/2007 | Najima | ............... | E05B 13/005 70/208 |
| 2008/0007081 A1 * | 1/2008 | Shibata | ............... | E05B 47/0009 296/37.12 |
| 2009/0206625 A1 * | 8/2009 | Toppani | ............... | E05B 13/10 296/37.12 |
| 2011/0174027 A1 * | 7/2011 | Ookawara | ............... | E05B 83/30 70/159 |
| 2011/0309640 A1 * | 12/2011 | Matsubara | ............... | E05B 63/248 292/159 |
| 2011/0309642 A1 * | 12/2011 | Shimizu | ............... | E05B 83/30 292/336.3 |
| 2012/0126563 A1 * | 5/2012 | Kuwano | ............... | B60R 7/06 296/37.12 |
| 2015/0008680 A1 * | 1/2015 | Suzuki | ............... | E05C 1/08 292/32 |
| 2015/0152671 A1 * | 6/2015 | Nakasone | ............... | E05B 1/0038 292/169 |
| 2019/0218834 A1 * | 7/2019 | Komatsu | ............... | E05B 85/22 |
| 2020/0378163 A1 * | 12/2020 | Singh | ............... | E05B 83/30 |
| 2020/0392772 A1 * | 12/2020 | Carabalona | ............... | E05B 13/10 |
| 2020/0408010 A1 * | 12/2020 | Takai | ............... | E05B 79/14 |

* cited by examiner

LATCH ASSEMBLY FOR GLOVEBOX

FIELD OF THE INVENTION

The present invention relates to a latch assembly for a glovebox in an automobile. More specifically, the present invention relates to a latch assembly having a ghost latch feature wherein a handle portion of the latch mechanism is capable of rotating as if the latch is unlocked while the latch is locked.

BACKGROUND OF THE INVENTION

In general, an automobile is provided with a glovebox compartment for storing items. A typical glovebox compartment includes an opening in an instrument panel of the automobile, a glovebox door pivotally connected to the instrument panel for closing the opening in the instrument panel, and a latch assembly for maintaining a closed position of the glovebox door.

A typical latch assembly includes a handle portion pivotally connected to the glovebox door, a key cylinder rotatably disposed on the handle portion and formed to receive a key to switch between a locked state and an unlocked state, and a latching unit for engaging the instrument panel to maintain a closed position of the glovebox door.

The opening of the glovebox compartment is normally closed by the glovebox door. The glovebox compartment is formed so that when the key cylinder is in the locked state and the handle portion is operated, the latching unit maintains the engagement between the glovebox door and the instrument panel, and when the key cylinder is in the unlocked state and the handle portion is operated, the latching unit releases the glovebox door and the weight of the glovebox door causes the glovebox door to swing open downwardly.

Problems to be Solved by the Invention

Currently, the latch assembly for the glovebox compartment includes two operating styles. In the first operating style, the handle portion is incapable of rotating in the locked state. In the second operating style (also known as "the ghost latch"), the handle portion is capable of rotating in the locked state of the latch as if the handle portion can open the glovebox compartment.

A standard latch assembly for the glovebox compartment has the first operating style. The standard latch assembly includes a striker positioned directly behind the key cylinder and protruding rearward to connect the handle portion and the latching unit so that in the unlocked state, when the handle portion is operated, the striker strikes the latching unit to disengage the glovebox door from the instrument panel, and in the locked state, the handle portion is prevented from rotating and maintains the engagement between the latching unit and the instrument panel.

However, the second operating style is becoming more popular in the current market; thus, a latch assembly with the ghost latch feature is in demand.

Further, current automobiles have a metal knee bolster provided on the glovebox door of the glovebox compartment. The metal knee bolster has a thickness greater than that of the standard latch assembly. Further, in the future, the metal knee bolster arranged on the glovebox door will be replaced with an airbag arranged below the glovebox compartment, which requires a space less than that requires for the metal knee bolster. Thus, reducing the thickness of the latch assembly reduces the overall thickness of the glovebox door, which maximizes the storage space of the glovebox compartment.

Therefore, the objective of the present invention is to provide a latch assembly for a glovebox compartment having a ghost latch feature with a reduced overall thickness to maximize the storage space of the glovebox compartment.

Means for Solving the Problems

In order to obtain the aforementioned object, in the present invention, a latch assembly for closing a door of a glovebox compartment includes a key cylinder having an eccentric shaft; a striker connected to the key cylinder to form a scotch-yoke connection to the eccentric shaft so that a rotation of the key cylinder is transformed to a linear movement of the striker; and a pair of latching members adapted to lock the door. The pair of latching members includes a first latching member having an operation portion to engage or disengage from the striker, and a second latching member connected to the first latching member to simultaneously move with the first latching member. The key cylinder rotates to switch between an unlocked state in which the striker engages the operation portion and a locked state in which the striker is disengaged from the operation portion.

According to such configuration, the key cylinder and the striker have a scotch yoke connection (also known as a slotted link mechanism), wherein a rotation of the key cylinder is converted to a linear motion of the striker, and the pair of latch members will only move when the key cylinder is rotated to connect to the pair of latch members through the striker. Thus, the latch assembly is provided with the ghost latch feature.

Further, in one embodiment, the operation portion is arranged below the handle portion so that the pair of latching members is not arranged behind the handle portion. By arranging the operation portion below the handle portion, the overall thickness of the latch assembly is reduced. More specifically, a standard latch assembly has a thickness of approximately 50 mm; however, with the above-mentioned arrangement, the thickness of the latch assembly is reduced to 35 mm; thereby, increasing the storage space of the glovebox compartment.

Other features of the present embodiment will become apparent from the following detailed description and the scope of patent claims taken in conjunction with the accompanying drawings.

BRIEF DESCRIPTION OF THE DRAWINGS

FIGS. 2(a) and 2(b) are perspective views of a latch assembly of the first embodiment, wherein FIG. 2(a) is a perspective view of the latch assembly with a handle portion in a standard position, and FIG. 2(b) is a perspective view of the latch assembly with the handle portion in an operation position.

FIGS. 5(a) and 5(b) are rear views thereof, wherein FIG. 5(a) is a rear view wherein a key cylinder is in an unlocked state and the handle portion is in the standard position, and FIG. 5(b) is a rear view wherein the key cylinder is in the unlocked state and the handle portion is in the operation position.

FIGS. 6(a) and 6(b) are rear views thereof, wherein FIG. 6(a) is a rear view wherein the key cylinder is in a locked state and the handle portion is in the standard position, and FIG. 6(b) is a rear view wherein the key cylinder is in the locked state and the handle portion is in the operation position.

FIGS. 8(a) and 8(b) are rear views of the handle portion thereof, wherein FIG. 8(a) is a rear view wherein the key cylinder is in the unlocked state, and FIG. 8(b) is a rear view wherein the key cylinder is in the locked state.

FIGS. 9(a)-9(c) show the handle portion and one of a pair of latching members of the second embodiment in the unlocked state, wherein FIG. 9(a) is a perspective view thereof, FIG. 9(b) is a plan view showing the handle portion in the standard position, and FIG. 9(c) is a plan view showing the handle portion in the operation position.

FIGS. 10(a)-10(c) show the handle portion and said one of the pair of latching members of the second embodiment in the locked state, wherein FIG. 10(a) is a perspective view thereof, FIG. 10(b) is a plan view showing the handle portion in the standard position, and FIG. 10(c) is a plan view showing the handle portion in the operation position.

DETAILED DESCRIPTION OF THE EMBODIMENTS

Hereinafter, the present embodiment is explained based on the drawings. In an explanation, terms indicating the directions follow the directions shown by a direction key. However, an arrangement of a latch assembly according to the present embodiment is not limited to the aforementioned directions.

The left-right direction is defined as the horizontal direction. The front-rear direction is defined as the thickness direction. The up-down direction is defined as the vertical direction.

FIGS. 1-6(b) disclose a latch assembly 1 of the first embodiment. The latch assembly 1 includes a pair of latching members 3 for engaging a glovebox door D to an instrument panel IP, a handle portion 5 for operating the pair of latching members 3, and a striker 7 for conveying the operation of the handle portion 5 to the pair of latching members 3.

Figure 1:
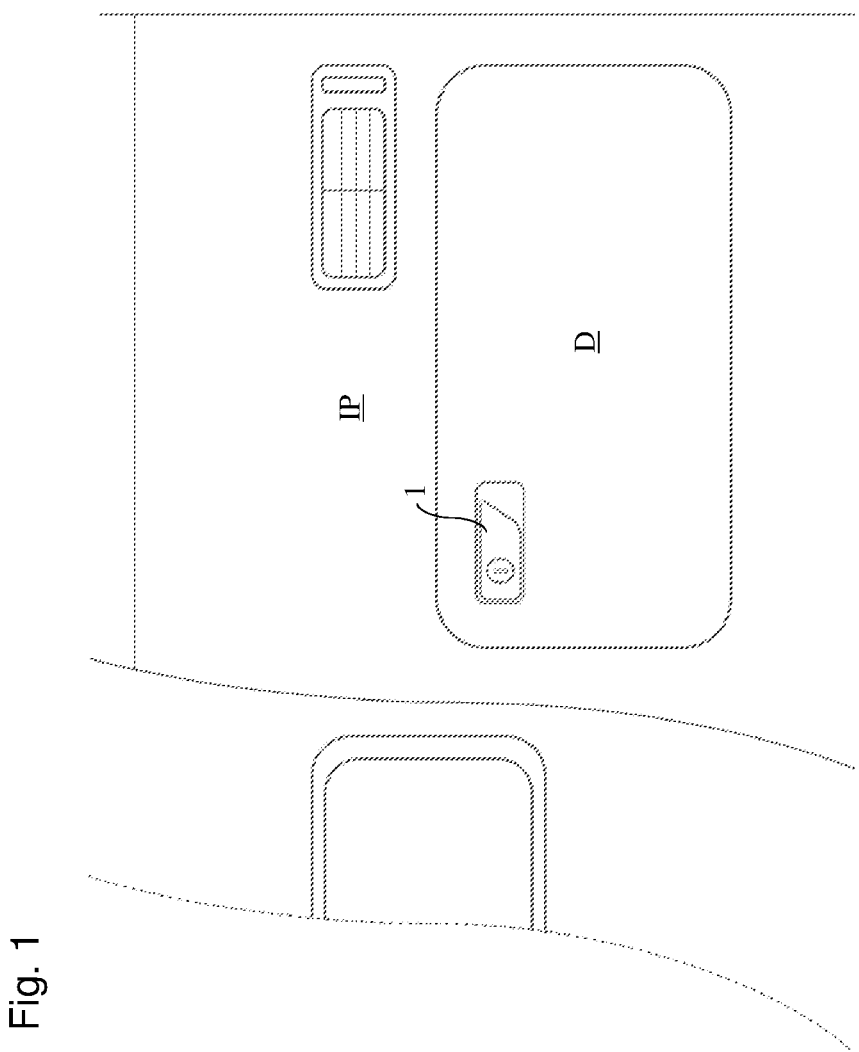
FIG. 1 is a partial view of an interior of an automobile showing a glovebox compartment with a latch assembly of the first embodiment.
Figure 2B:
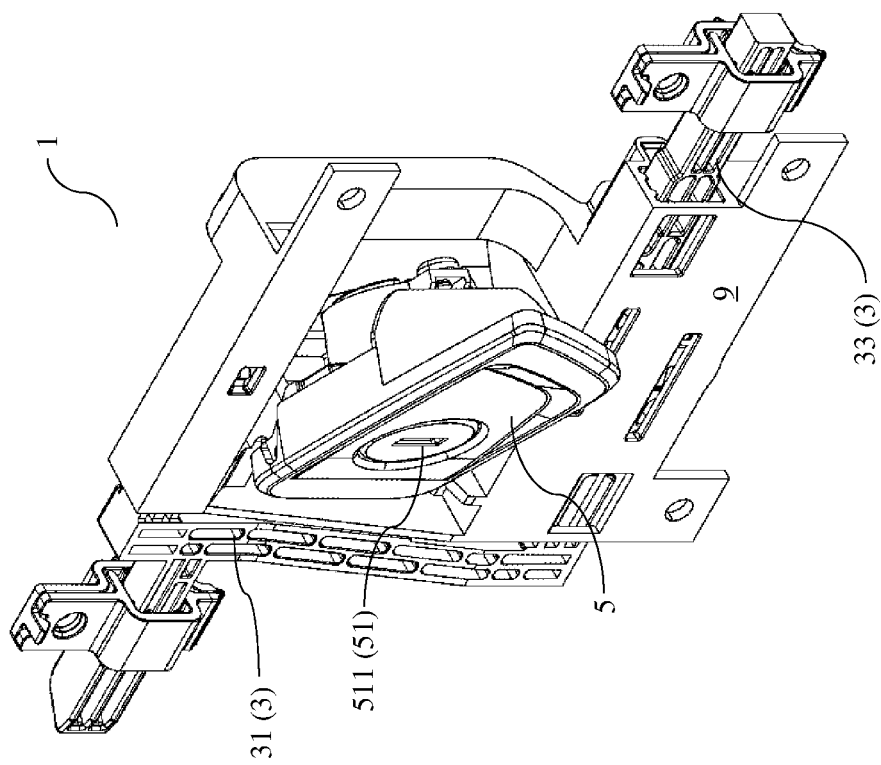
Figure 2A:
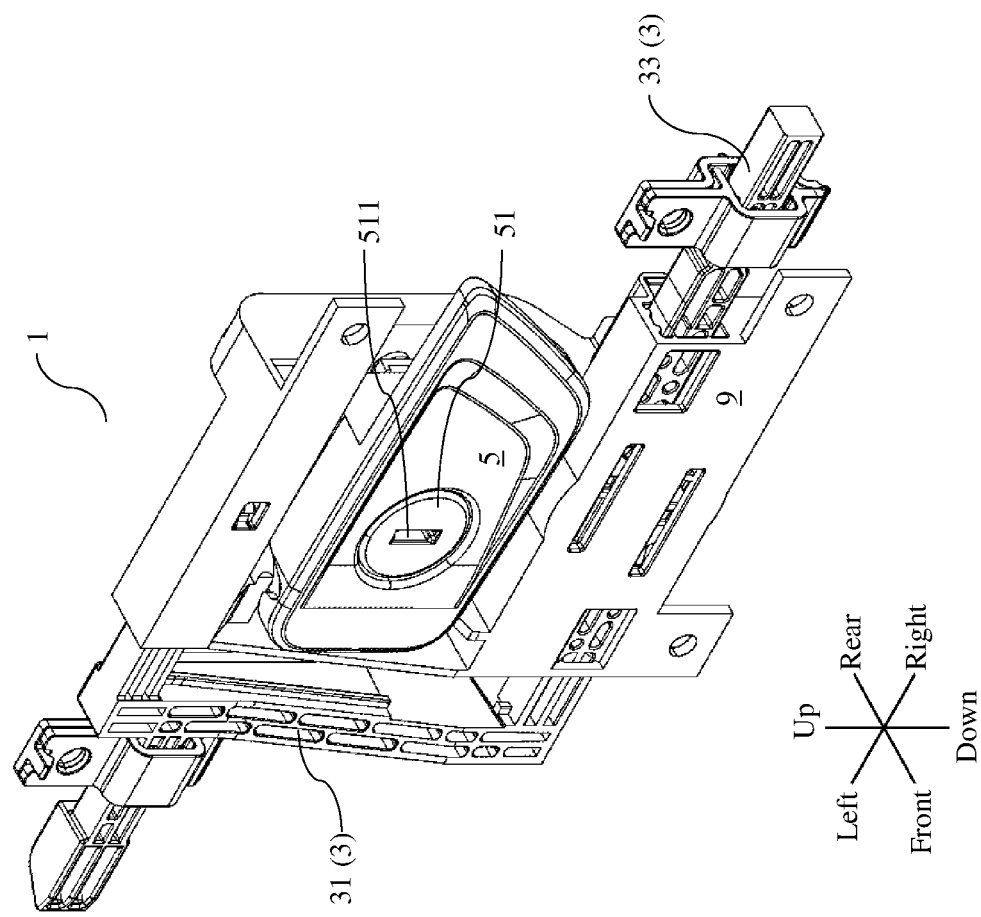
Figure 3:
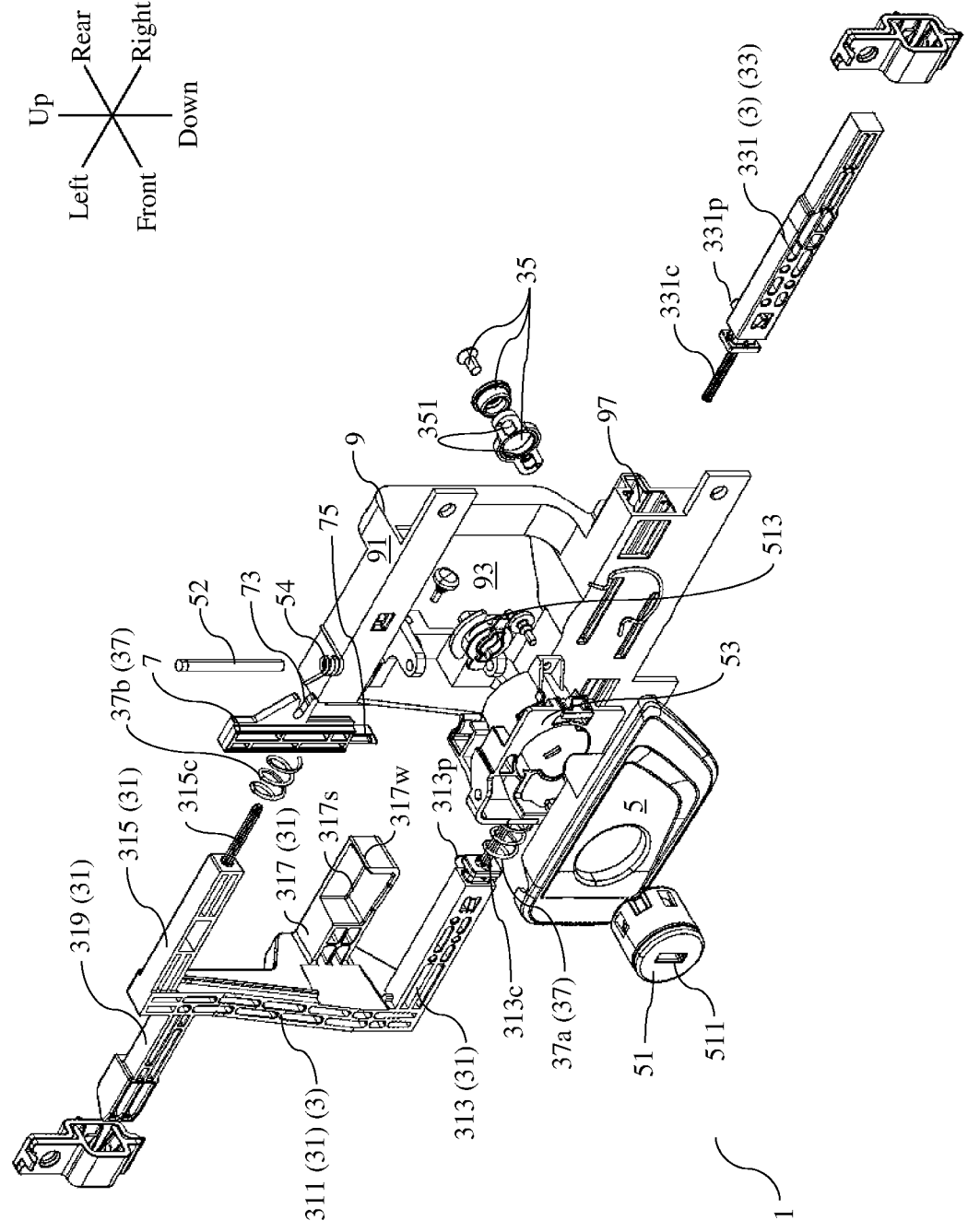
FIG. 3 is an exploded perspective view thereof.
Figure 4:
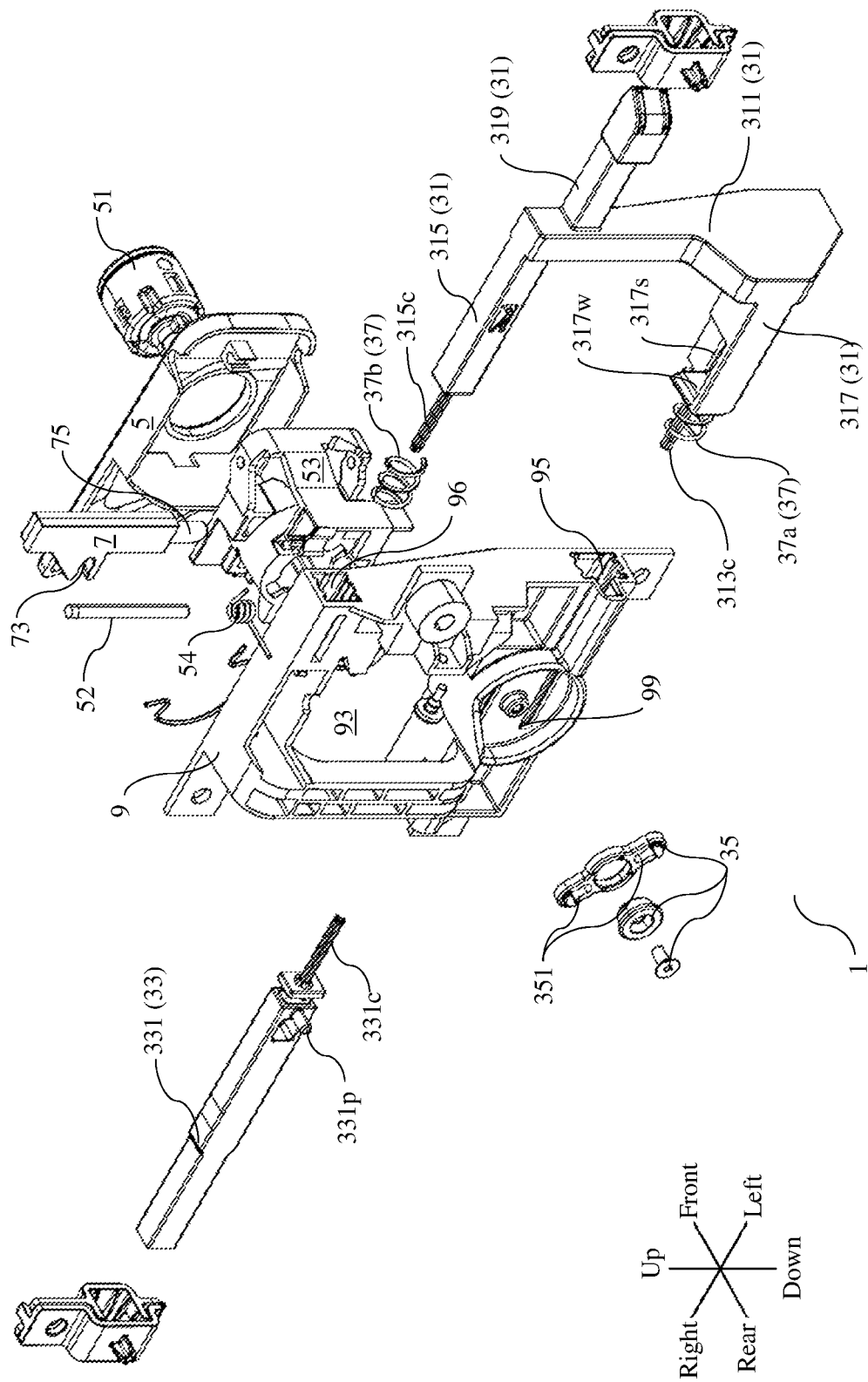
FIG. 4 is another exploded perspective view thereof.

The handle portion 5 is a lever having one end portion disposed with a main shaft 52 with which the handle portion 5 rotates and the other end portion, which is a free end to allow a user to grab and rotate the handle portion 5 along the main shaft 52. In the present embodiment, a front side of the handle portion 5 is the exterior surface exposed to the user and the main shaft 52 is arranged on the left side of the handle portion 5. The handle portion 5 is in the standard position as shown in FIG. 2(a), wherein the user grabs the handle portion 5 on the right end and pulls toward the front direction to rotate the handle portion 5 to the operation position as shown in FIG. 2(b). An urging member such as a coil spring 54 is provided to urge the handle portion 5 to the standard position from the operation position.

A key cylinder 51 is rotatably arranged on the handle portion 5 and includes a key hole 511 on the front side for receiving a key. The user inserts the key into the key hole 511 to rotate the key cylinder 51 and switch the key cylinder 51 between an unlocked state wherein the pair of latching members 3 and the handle portion 5 are connected through the striker 7 to be able to convey the rotation of the handle portion 5 to the pair of latching member 3 to open the glovebox door D, and a locked state wherein the pair of latching members 3 and the handle portion 5 are not connected through the striker 7 to not convey the rotation of the handle portion 5 to the pair of latching members 3 to open the glovebox door D so that even if the handle portion 5 was rotated, the engagement of the pair of latching members 3 to the instrument panel IP is maintained.

The key cylinder 51 includes a tumbler 513 on the rear side and an eccentric shaft 514 to connect to the striker 7. As shown in FIGS. 5(a)-6(b), in the present embodiment, the eccentric shaft 514 protrudes from a rear face of the tumbler 513 toward the rear direction and is arranged at a left side near the circumference of the tumbler 513 to scotch yoke connect to the striker 7. In other words, the scotch yoke connection between the key cylinder 51 and the striker 7 through the eccentric shaft 514 conveys a rotational motion of the key cylinder 51 into a linear motion of the striker 7.

An inner frame 53 is provided on the rear side of the handle portion 5 to support the main shaft 52, the key cylinder 51, and the striker 7. In the present embodiment, the inner frame 53 supports the main shaft 52 at the left end portion of the handle portion 5 and the tumbler 513 near a center of the handle portion 5. The inner frame 53 is integrally formed with a guiding portion 55 for supporting and guiding the striker 7 in the vertical direction. More specifically, the guiding portion 55 of the inner frame 53 includes a vertically extending wall portion 551 and a pair of arms 553 spaced apart from each other in the vertical direction to support the striker 7 in the vertical direction, see FIGS. 5(a)-6(b).

The striker 7 is arranged behind the tumbler 513 and formed to move in the vertical direction to engage or disengage one of the pair of latching members 3. The striker 7 has a tumbler connector 73 arranged at a right side portion to pivotally connect to the tumbler 513 and a latch connector 75 arranged at the bottom end portion to engage one of the pair of latching members 3.

The tumbler connector 73 is a slot to receive the eccentric shaft 514 of the tumbler 513, and the latch connector 75 is a protruding portion protruding downward to connect to the one of the pair of latching members 3 in the unlocked state.

Next, detailed descriptions are provided for the pair of latching members 3 including first and second latching members 31, 33 to engage the instrument panel IP, a circular connector 35 ("connecting member") arranged to connect the first and second latching members 31, 33, and a latch case 9 to support the first and second latching members 31, 33, the circular connector 35, and the handle portion 5.

The first latching member 31 includes a main body portion ("first main body portion") 311 extending in the vertical direction, a first body piece 313 extending toward the right direction from a lower end of the main body portion 311, a second body piece 315 extending toward the right direction from an upper end of the main body portion 311, a third body piece 317 extending toward the right direction from the main body portion 311 between the upper end and the lower end thereof, and a fourth body piece 319 extending toward the left direction from the main body portion 311.

The first body piece 313 is integrally formed with a pin portion ("first pin portion") 313p on a rear side and extending in a rear direction to engage the circular connector 35. Further, a cylindrical piece ("first cylindrical piece") 313c extending toward the right direction is integrally formed at one end of the first body piece 313 opposite to the other end connected to the main body portion 311.

The second body piece 315 is provided as a second support for the first latching member 31 to stabilize the movement of the first latching member 31. In other words, the first latching member 31 is supported by the latch case 9 at the upper end and the lower end to reduce the rattling during the movement of the first latching member 31. Further, a cylindrical piece ("second cylindrical piece") 315c extending toward the right direction is formed at one end of the second body piece 315 opposite to the other end connected to the main body portion 311.

The third body piece 317 includes a striker receiving space 317s for receiving the latch connector 75 of the striker 7 and the operation portion 317w, which is one sidewall defining a portion of the striker receiving space 317s for abutting the latch connector 75 of the striker 7. In the unlocked state wherein the striker 7 engages the first latching member 31, the latch connector 75 abuts against the operation portion 317w to convey the rotation of the handle portion 5 to the first latching member 31, see FIGS. 5(a), 5(b). In the locked state, the striker 7 is disengaged from the first latching member 31 to prevent the striker 7 from abutting against the operation portion 317w, see FIGS. 6(a), 6(b).

One end of the fourth body piece 319 opposite to the other end connected to the main body portion 311 engages the instrument panel IP.

The second latching member 33 includes a main body portion ("second main body portion") 331 extending in the horizontal direction wherein one end of the main body portion 331 engages the instrument panel IP and the other end of the main body portion 331 is integrally formed with a cylindrical piece ("third cylindrical piece") 331c extending toward the left direction. The main body portion 331 is integrally formed with a pin portion ("second pin portion") 331p on a rear side and extending in a rear direction to engage the circular connector 35.

The circular connector 35 is rotatably attached to the latch case 9 and includes two slots 351 to receive the first and second pin portions 313p and 331p, respectively, so that the circular connector 35 conveys the movement of the first latching member 31 to the second latching member 33 to simultaneously move the second latching member 33.

The latch case 9 includes a latch case body portion 91 formed with a handle portion space 93, first and second spaces 95, 96 for slidably receiving the first and second body pieces 313, 315 of the first latching member 31, a space 97 for slidably receiving the main body portion 331 of the second latching member 33, and a circular connector space 99 for receiving the circular connector 35. The circular connector space 99 communicates with the spaces 95, 97 for slidably receiving the first body piece 313 of the first latching member 31 and the main body portion 331 of the second latching member 33, respectively, and spaces (not shown) for slidably receiving the first and third cylindrical pieces 313c, 331c of the first body piece 313 of the first latching member 31 and the second latching member 33, respectively.

An urging member 37 is provided to urge the first latching member 31 toward the instrument panel IP to maintain the engagement between the pair of latching members 3 and the instrument panel IP. In the present embodiment, two urging members 37a, 37b, which are coil springs, are provided, wherein the first coil spring 37a is wound around the first cylindrical piece 313c with one end of the first coil spring 37a abutting against the one end of first body piece 313 and the other end of the first coil spring 37a abutting against a wall of the latch case 9 formed with the space to slidably receive the first cylindrical piece 313c, and the second coil spring 37b is wound around the second cylindrical piece 315c with one end of the second coil spring 37b abutting against the one end of second body piece 315 and the other end of second coil spring 37b abutting against a wall of the latch case 9 formed with the space to slidably receive the second cylindrical piece 315c.

Between the second space 96 for the second body piece 315 of the first latching member 31 and the circular connector space 99, the handle portion space 93 is formed to receive the handle portion 5.

Next an operation of the latch assembly 1 in the first embodiment is explained in details.

Figure 5A:
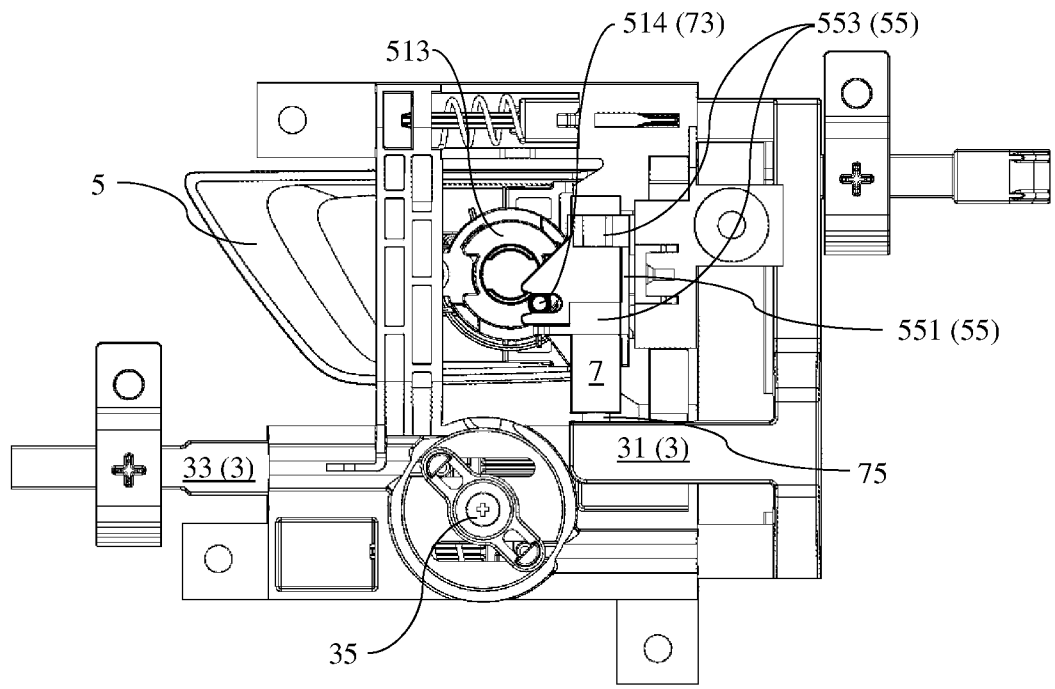
Figure 5B:
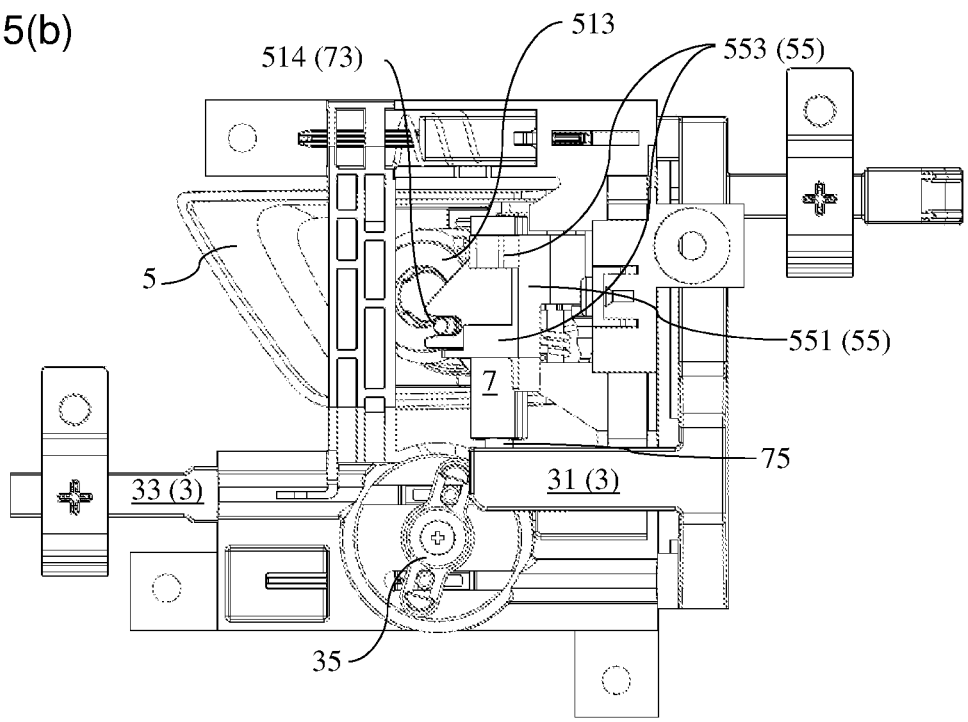

As shown in FIG. 5(a), when the key cylinder 51 is in the unlocked state, the latch connector 75 of the striker 7 abuts against the operation portion 317w of the first latching member 31. As shown in FIG. 5(b), when the handle portion 5 is pulled to the front direction to rotate about the main shaft 52, the guiding portion 55 of the inner frame 53 fixed to the handle portion rotates together with the handle portion 5 to also rotate the striker 7. At this time, the striker 7 also moves toward the right direction and push the first latching member 31. The first latching member 31 moves toward the right direction to retract the first latching member 31 from the instrument panel IP and simultaneously rotates the circular connector 35 engaged to the first latching member 31 through the first pin portion 313p. The second latching member 33 moves toward the left direction to retract the second latching member 33 from the instrument panel IP; thus, the pair of latching members 3 is disengaged from the instrument panel IP to allow the glovebox door D to open.

To switch from the unlocked state to the locked state, the user inserts the key into the key hole 511 of the key cylinder 51 and rotates the key in the clockwise direction to rotate the key cylinder 51 in the clockwise direction.

Figure 6A:
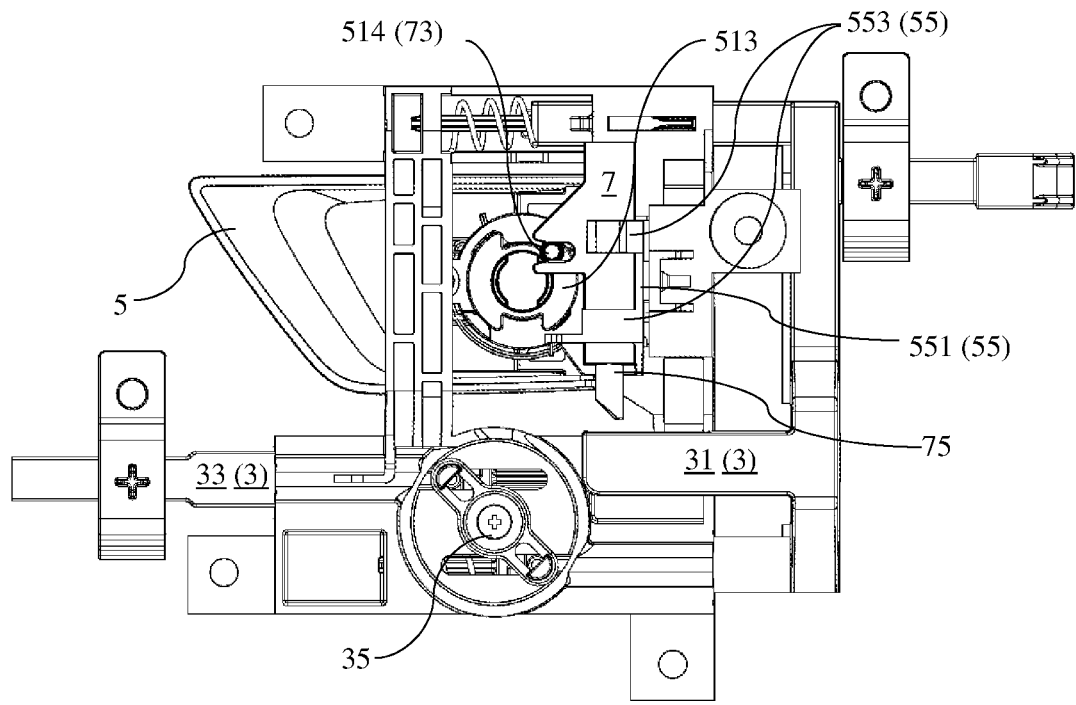
Figure 6B:
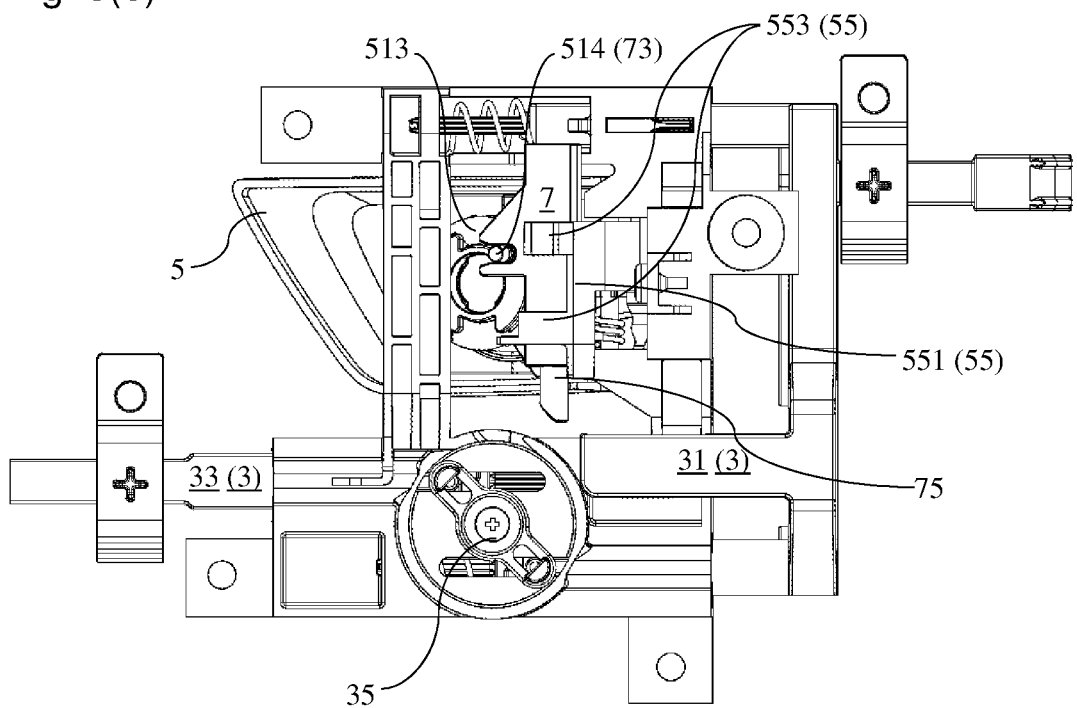
Figure 7:
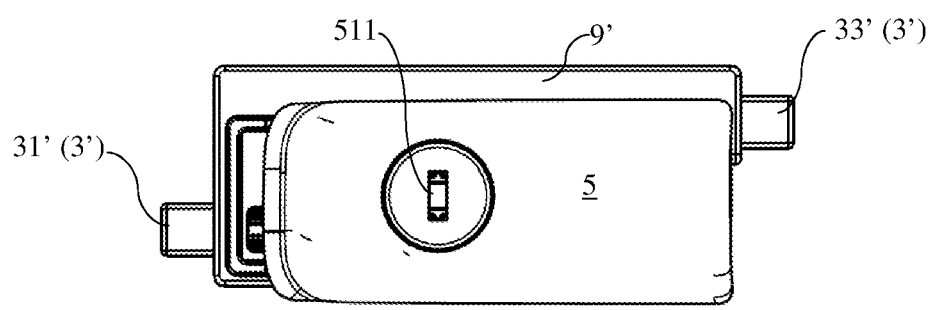
FIG. 7 is a perspective view of the latch assembly of the second embodiment.

As shown in FIG. 6(a), the rotation of the key cylinder 51 moves the striker 7 upward so that the latch connector 75 moves away from the operation portion 317w of the first latching member 31 so that the latch connector 75 of the striker 7 does not abut against the operation portion 317w of the first latching member 31. As shown in FIG. 6(b), when the handle portion 5 is pulled to the front direction to rotate about the main shaft 52, the latch connector 75 of the striker 7 moves along with the handle portion 5 without moving the first latching member 31. Thus, the rotation of the handle portion 5 is not conveyed to the first latching member 31 so that the pair of latching members 3 maintains the engagement with the instrument panel IP while the handle portion 5 is capable of rotating about the main shaft 52.

Thus, the latch assembly 1 of the first embodiment has the ghost latch feature and since the pair of latching members 3 is not provided behind the handle portion 5, the thickness of the latch assembly is also reduced. More specifically, a standard latch assembly has a thickness of approximately 50 mm; however, with the configuration of the first embodiment, the thickness of the latch assembly is reduced to 35 mm.

Next, a second embodiment according to the present invention will be explained. An explanation of a structure common to the first embodiment is omitted, and the same symbols are assigned. In the second embodiment, the striker 7' is formed to slide in the horizontal direction to engage or disengage the first latching member 31'.

FIGS. 7-10(c) disclose a latch assembly 1' of the second embodiment.

In the second embodiment, the handle portion 5 is formed generally the same as the first embodiment with the exception of the tumbler 513' and the guiding portion 55' of the inner frame 53'.

The tumbler 513' of the second embodiment has a configuration similar to that of the first embodiment. However, the eccentric shaft 514' in the second embodiment is at a lower half of the tumbler 513' to scotch yoke connect to the tumbler connector 73' of the striker 7'. In other words, the scotch yoke connection between the key cylinder 51 and the striker 7' through the eccentric shaft 514' conveys a rotational motion of the key cylinder 51 into a linear motion of the striker 7'.

The guiding portion 55' of the inner frame 53' is a shaft portion protruding rearward to slidably connect to the striker 7'.

Figure 8A:
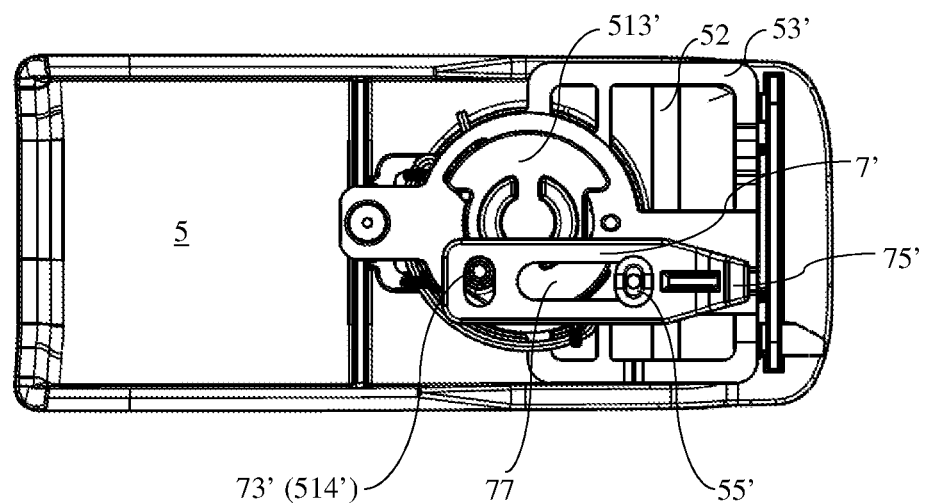
Figure 8B:
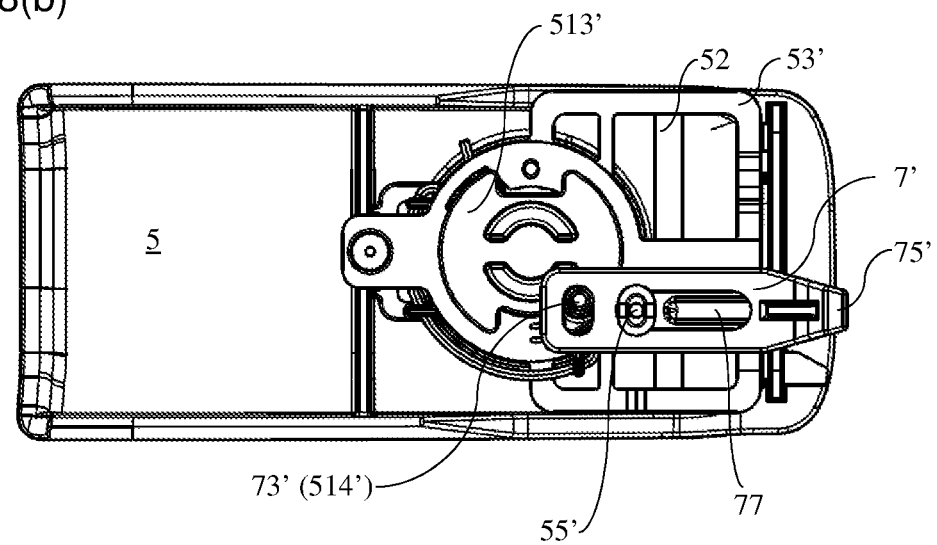

The striker 7' is arranged behind tumbler 513' and formed to move in the horizontal direction to engage or disengage the first latching member 31' through the operation portion, see FIGS. 8(a), 8(b). The striker 7' is arranged between the tumbler 513' and the first latching member 31' in the thickness direction of the latch assembly 1'. The striker 7' has the tumbler connector 73' arranged at one end portion to rotatably connect to the tumbler 513', the latch connector 75' arranged at the other end portion to engage the first latching member 31', and an elongated hole 77 arranged between the tumbler connector 73' and the latch connector 75' to slidably engage the guiding portion 55' of the inner frame 53'.

In the second embodiment, the tumbler connector 73' is a circular hole to receive the eccentric shaft 514' of the tumbler 513'. The elongated hole 77 extends in the horizontal direction to slidably receive the guiding portion 55'. The latch connector 75' is a hook extending rearward to abut against the operation portion 317w' of the first latching member 31' in the unlocked state.

The first latching member 31' includes the main body portion 311' extending in the horizontal direction, wherein one end of the main body portion 311' engages the instrument panel IP, and the other end of the main body portion 311' is integrally formed with the cylindrical piece ("first cylindrical piece") 313c'.

The main body portion 311' includes the first pin portion 313p for engaging the circular connector 35, the striker receiving space 317s' for receiving the latch connector 75' of the striker 7', and the operation portion 317w', which is one sidewall defining a portion of the striker receiving space 317s' for abutting against the latch connector 75' of the striker 7'. In the unlocked state wherein the striker 7' engages the pair of latching members 3', the latch connector 75' abuts against the operation portion 317w' to convey the rotation of the handle portion 5. In the locked state, the latch connector 75' of the striker 7' is spaced apart from the operation portion 317w' to prevent the striker 7' from abutting against the operation portion 317w'.

Although the latch case 9' of the second embodiment has a shape different from that of the first embodiment, the difference is due to the shape of the first latching member 31'. Therefore, the general function of the latch case 9' of the second embodiment is same as that of the first embodiment, and the detailed explanation of the latch case 9' of the second embodiment is omitted.

In the second embodiment, the urging member 37' to urge the first latching member 31' toward the instrument panel IP to maintain the engagement between the pair of latching members 3 and the instrument panel IP is also provided. However, unlike the first embodiment, only one coil spring 37' is provided wherein the coil spring 37' is wound around the first cylindrical piece 313c' with one end of the coil spring 37' abutting against the one end of main body portion 311' of the first latching member 31' and the other end of the coil spring 37' abutting against a wall of the latch case 9' formed with the space to slidably receive the first cylindrical piece 313c of the first latching member 31'.

Next an operation of the latch assembly 1' is explained in details.

Figure 9A:
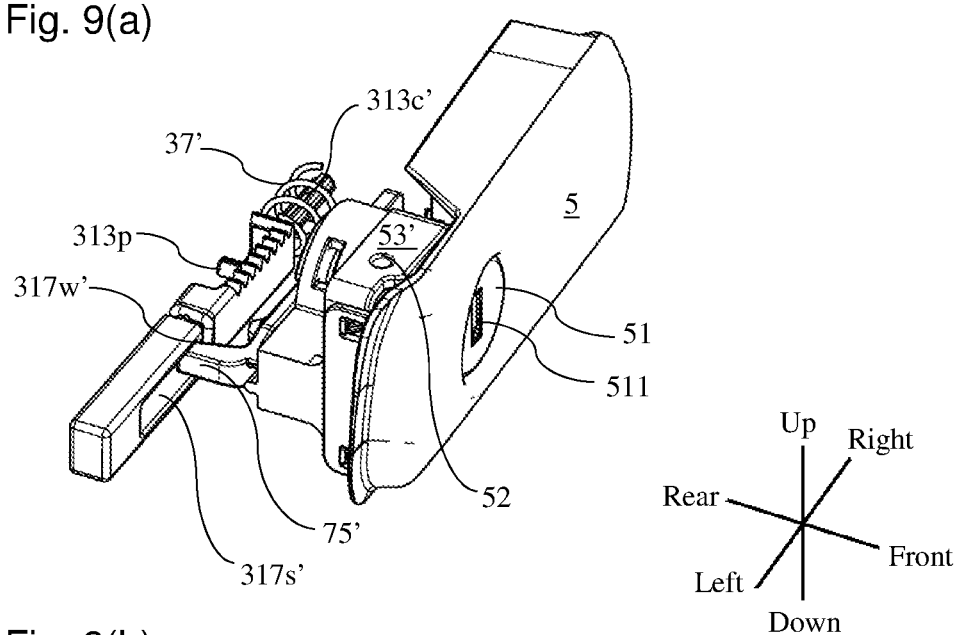
Figure 9B:
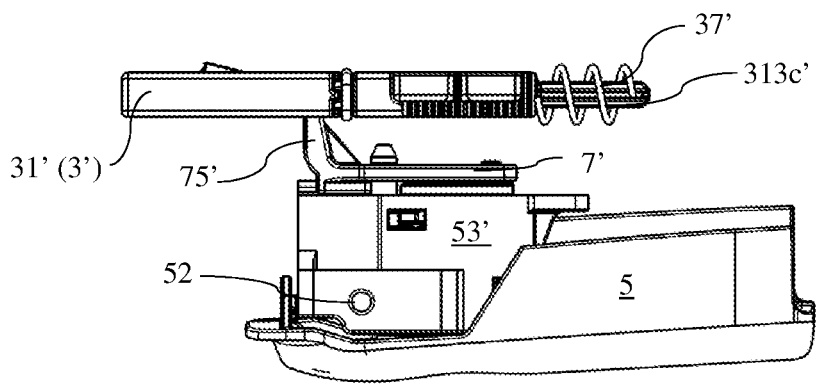
Figure 9C:
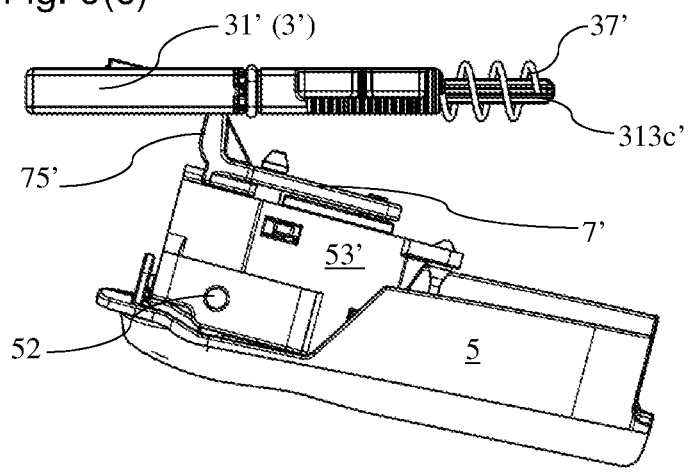

As shown in FIGS. 9(a), 9(b), when the key cylinder 51 is in the unlocked state, the latch connector 75' of the striker 7' abuts against the operation portion 317w' of the first latching member 31'. As shown in FIG. 9(c), when the handle portion 5 is pulled to the front direction to rotate about the main shaft 52, the inner frame 53' rotates along with the handle portion 5 and the striker 7' pushes the first latching member 31'. The first latching member 31' moves toward the right direction to retract the first latching member 31' from the instrument panel IP and simultaneously rotates the circular connector 35 engaged to the first latching member 31' through the first pin portion 313p. The second latching member 33' moves toward the left direction to retract the second latching member from the instrument panel IP; thus, the pair of latching members 3' is disengaged from the instrument panel IP to allow the glovebox door D to open.

To switch from the unlocked state to the locked state, the user inserts the key into the key hole 511 of the key cylinder 51 and rotates the key in the clockwise direction to rotate the key cylinder 51 in the clockwise direction.

Figure 10A:
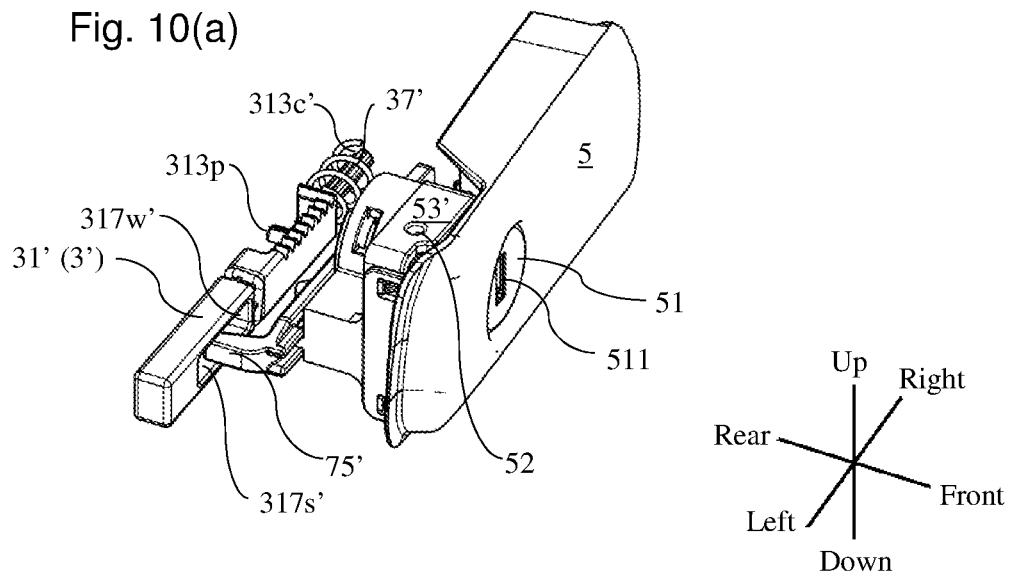
Figure 10B:
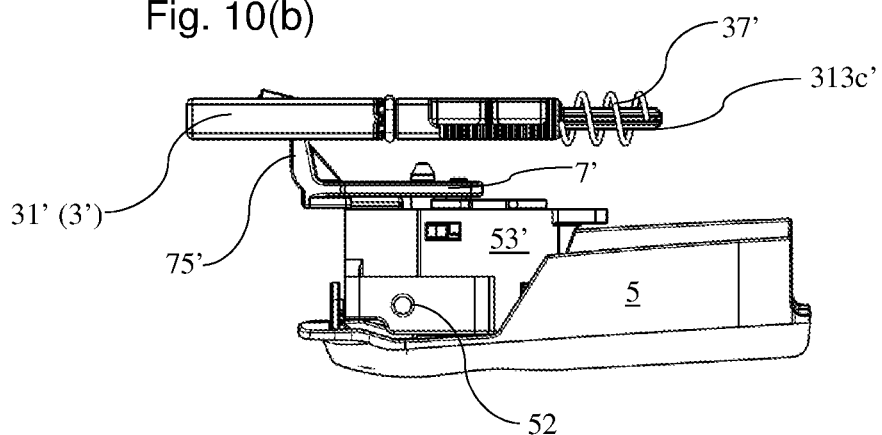
Figure 10C:
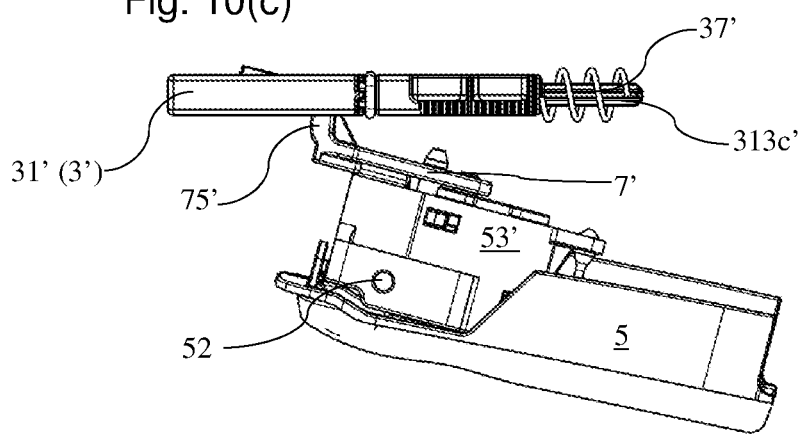

As shown in FIGS. 10(a), 10(b), the rotation of the key cylinder 51 moves the striker 7 in the left direction so that the latch connector 75' moves away from the operation portion 317w' of the first latching member 31' to prevent the latch connector 75' of the striker 7' from abutting against the operation portion 317w' of the first latching member 31'. As shown in FIG. 10(c), when the handle portion 5 is pulled to the front direction to rotate about the main shaft 52, the latch connector 75' of the striker 7' rotates along with the handle portion 5 without moving the first latching member 31'. Thus, the rotation of the handle portion 5 is not conveyed to the first latching member 31' so that the pair of latching members 3' maintains engagement with the instrument panel IP while the handle portion 5 is capable of rotating about the main shaft 52.

Thus, the latch assembly 1' of the second embodiment has the ghost latch feature. Although the pair of latching members 3' is provided behind the handle portion 5, the thickness of the latch assembly 1' is also reduced.

The above description simply illustrates the principle of the invention. Furthermore, a great number of modifications and alterations are possible for those skilled in the art, and the invention not being limited to the heretofore illustrated and described exact configurations and applications, all corresponding modification examples and equivalents are deemed to be within the scope of the invention defined by the attached claims and their equivalents.

Figure 11A:
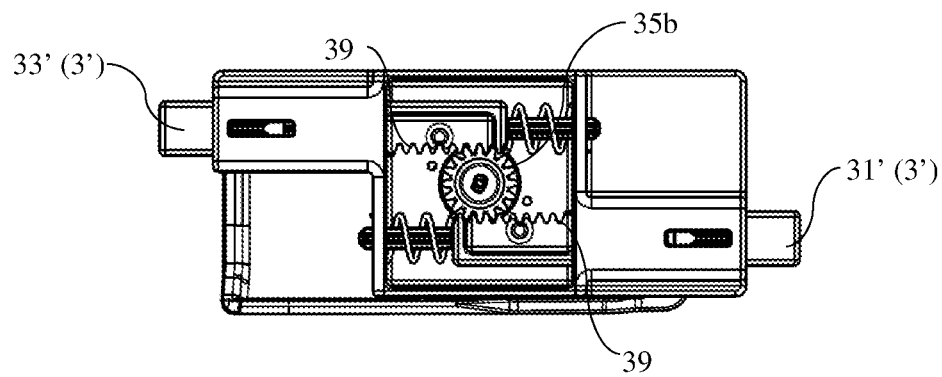
FIGS. 11(a)-11(b) are rear views of the latch assembly of the modified second embodiment.
Figure 11B:
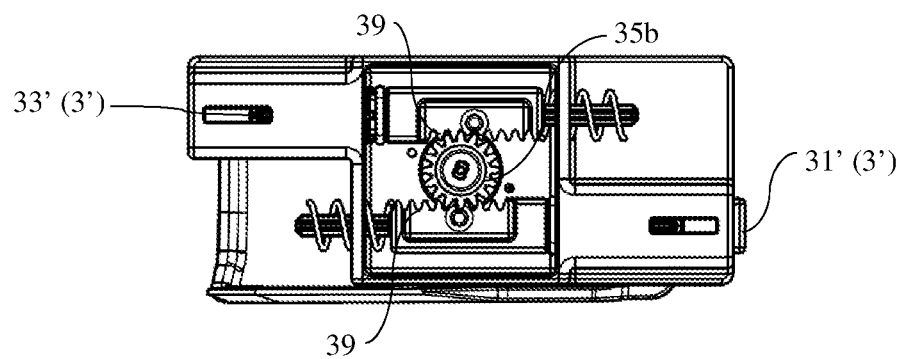

For example, in the heretofore described, a description has been given of a case in which the circular connector 35 is used to connect the first latching member 31' to the second latching member 33', but the invention not limited to this, a gear member 35b may be used to connect the first latching member 31' to the second latching member 33'. As shown in FIGS. 11(a) and 11(b), each of the first and second latching members 31', 33' includes a teeth portion 39 to engage the gear member 35b so that when the first latching member 31' moves toward the right direction, the gear member 35b conveys the movement of the first latching member 31' to the second latching member 33' to simultaneously move the second latching member 33' toward the left direction.

Further, the gear member 35b may be a rotational damper, e.g. oil damper, to control a return speed of the pair of latching members 3' from the operation position to the standard position so that the sound of the pair of latching members 3' generated from abutting the instrument panel IP may be reduced.

What is claimed is:

1. A latch assembly for closing a door of a glovebox compartment, comprising:
    a latch case configured to be fixed to the door;
    a handle portion rotatably attached to the latch case through a shaft;
    a key cylinder provided in the handle portion to rotate relative to the latch case together with the handle portion and having an eccentric shaft;
    a striker provided in the handle portion and connected to the key cylinder through the eccentric shaft, the striker being arranged to rotate relative to the latch case together with a rotation of the handle portion and move linearly upon a rotation of the key cylinder; and
    a pair of latching members attached to the latch case separately from the handle portion and adapted to lock the door, the pair of latching members including a first latching member having an operation portion to engage with or disengage from the striker upon the rotation of the key cylinder, and a second latching member connected to the first latching member to simultaneously move with the first latching member,
    wherein when the handle portion rotates relative to the latch case, the striker always moves together with the handle portion, and
    when the key cylinder rotates, the striker moves linearly to connect with or disconnect from the first latching member to switch between an unlocked state in which the striker engages the operation portion so that an operation of the handle portion is transferred to the pair of latching member, and a locked state in which the striker is disengaged from the operation portion so that the operation of the handle portion is not transferred to the pair of latching members.

2. A latch assembly according to claim 1, wherein the striker includes an opening to receive the eccentric shaft of the key cylinder so that when the key cylinder is rotated, the eccentric shaft of the key cylinder connected to the striker through the opening moves the striker to engage or disengage the first latching member.

3. A latch assembly according to claim 2, wherein the first latching member includes a striker receiving space for receiving the striker,
    the operation portion is a sidewall defining a portion of the striker receiving space for abutting against the striker, and
    when the key cylinder is in the unlocked state, the striker abuts against the operation portion of the first latching member to move the first latching member, and in the locked state, the striker is spaced apart from the operation portion to prevent the striker from moving the first latching member.

4. A latch assembly according to claim 3, further comprising:
    a connecting member connecting the first latching member to the second latching member so that the second latching member moves simultaneously with the first latching member.

5. A latch assembly according to claim 1, wherein the key cylinder and the striker are arranged on the handle portion to move along with the rotation of the handle portion so that when the key cylinder is rotated, the eccentric shaft of the key cylinder moves the striker.

6. A latch assembly according to claim 5, wherein a moving direction of the striker is perpendicular to that of the pair of latching member, and
    when the key cylinder is in the unlocked state, the striker abuts against the operation portion to convey the rotation of the handle portion, and in the locked state, the striker is arranged outside a striker receiving space to prevent the rotation of the handle portion from being conveyed to the first latching member.

7. A latch assembly according to claim 5, wherein the striker moves along a moving direction crossing an axial direction of the key cylinder to engage or disengage the operation portion,
    the moving direction of the striker is parallel to that of the pair of latching members, and
    when the key cylinder is in the unlocked state, the striker abuts the operation portion to convey the rotation of the handle portion, and in the locked state, the striker is arranged inside the striker receiving space and spaced from the operation portion to prevent the rotation of the handle portion from being conveyed to the first latching member.

8. A latch assembly for closing a door of a glovebox compartment, comprising:
    a latch case configured to be fixed to the door;
    a key cylinder having an eccentric shaft;
    a striker connected to the key cylinder through the eccentric shaft and arranged to move upon a rotation of the key cylinder;
    a handle portion rotatably attached to the latch case through a shaft and holding the key cylinder and the striker to rotate relative to the latch case together with the handle portion;
    a pair of latching members attached to the latch case separately from the handle portion and adapted to lock the door, the pair of latching members including a first latching member having an operation portion to engage with or disengage from the striker, and a second latching member connected to the first latching member to simultaneously move with the first latching member; and
    a connecting member connecting the first latching member to the second latching member so that the second latching member moves simultaneously with the first latching member,
    wherein the key cylinder rotates to switch between an unlocked state in which the striker engages the operation portion and a locked state in which the striker is disengaged from the operation portion,
    wherein the striker includes an opening to receive the eccentric shaft of the key cylinder so that when the key cylinder is rotated, the eccentric shaft of the key cylinder connected to the striker through the opening moves the striker to engage or disengage the first latching member,
    wherein the first latching member includes a striker receiving space for receiving the striker, the operation portion is a sidewall defining a portion of the striker receiving space for abutting against the striker, and when the key cylinder is in the unlocked state, the striker abuts against the operation portion of the first latching member to move the first latching member, and in the locked state, the striker is spaced apart from the operation portion to prevent the striker from moving the first latching member, wherein the key cylinder is rotatably disposed in the handle portion so that when the key cylinder is in the unlocked state and the handle portion is rotated, the striker conveys a rotation of the handle portion to the first latching member to move the first latching member, and the second latching member moves simultaneously with the first latching member through the connecting member to unlock the door, and when the key cylinder is in the locked state and the handle portion is rotated, the rotation of the handle portion is not conveyed to the first latching member and the door is locked, and wherein the key cylinder and the striker are arranged on the handle portion to move along with the rotation of the handle portion so that when the key cylinder is rotated, the eccentric shaft of the key cylinder moves the striker.

\* \* \* \* \*